J. C. QUINN.
MANUFACTURE OF CLAY ARTICLES.
APPLICATION FILED JUNE 15, 1911.
1,193,922.
Patented Aug. 8, 1916.
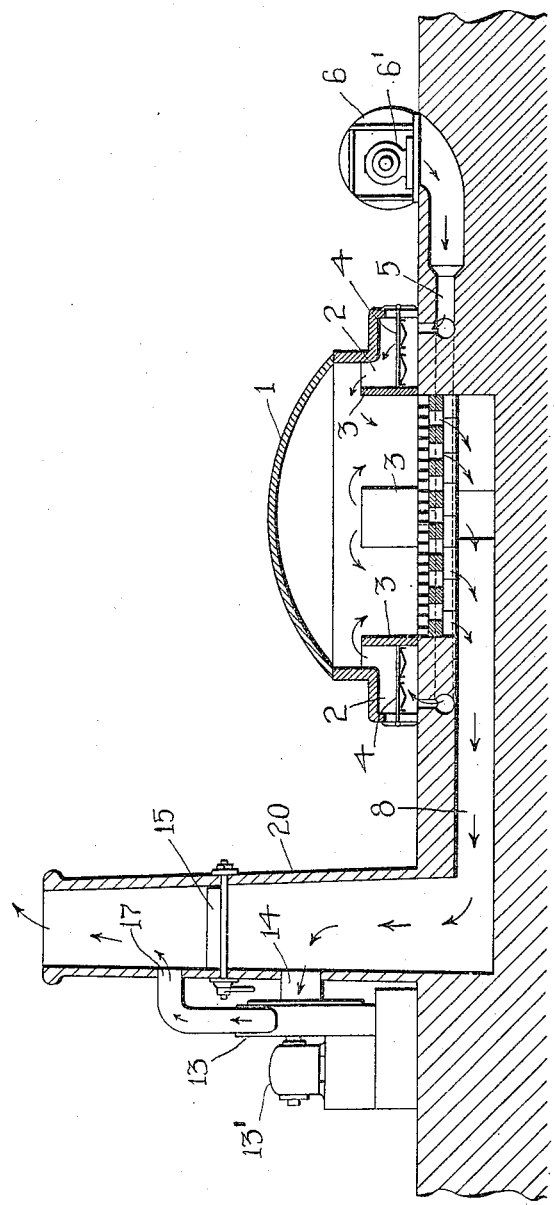
INVENTOR
ATTORNEYS

UNITED STATES PATENT OFFICE.

JOHN C. QUINN, OF NEW YORK, N. Y., ASSIGNOR TO THE ACME FURNACE EQUIPMENT COMPANY, OF NEW YORK, N. Y., A CORPORATION OF NEW YORK.

MANUFACTURE OF CLAY ARTICLES.

1,193,922.     Specification of Letters Patent.     Patented Aug. 8, 1916.

Application filed June 15, 1911. Serial No. 633,451.

*To all whom it may concern:*

Be it known that I, JOHN C. QUINN, of the city, county, and State of New York, have invented the new and useful Improvements in the Manufacture of Clay Articles, hereinafter set forth.

The object of the invention is to improve the efficiency of the process of burning flue linings and other clay products, as well as the quality of such products.

The improvement in the process relates both to the water-smoking and high-firing stages and consists essentially in establishing suitable beds of ignited coal adjacent the articles to be burned and then forcing air through such beds and simultaneously drawing the burning air and combustion gases through the stack of clay articles and from the kiln by means of a suction fan or other draft-inducing mechanism which is positive in its action and also under control, whereby a high velocity draft current is made to pass through the stack. The green clay articles are stacked in the kiln and the kiln closed as usual, and the beds of fuel are then kindled in the furnaces in the side walls of the kiln and supplied with air under pressure so that the combustion gases from each furnace pass into the kiln, preferably entering the same near the top, passing from thence downwardly, being drawn through the bottom of the kiln by means of the suction fan, and thence discharged into the atmosphere through a suitable chimney. The draft-current of combustion gases, which is thus set up and caused to pass through the stack of clay articles, has a higher velocity than can be obtained from the use of the natural draft of a chimney alone, or from the use of such chimney in conjunction with a forced-air draft supplied to the ash pits of the furnaces in which the fuel is consumed, and I have ascertained that even when the suction fan is used alone without the forced air supply, the results are not satisfactory. The high velocity, such as obtained by the combined and simultaneous use of forcing and suction means, as above described, is of particular advantage during the preliminary or water-smoking stage, in that the removal of the water vapor or steam converted from the moisture of the green clay in the upper layers of the stack takes place with such unusual rapidity that, in passing through the lower layers of green clay articles, it is not substantially recondensed by contact with their relatively cooler surfaces, and such lower layers of articles are, therefore, not liable to absorb further moisture and thereby become so soft as to be squashed by the superincumbent weight of the upper layers. The condition thus produced permits a very considerable increase in the degree of the water-smoking temperature, and hence reduces the time consumed for that preliminary operation without increasing the percentage of loss from breakage or popping; while at the same time the higher velocity operates throughout the whole stack, in the lower and cooler layers thereof, to assist in the removal of the water by the increased evaporative effect. By my process I am enabled to reduce the time for water-smoking from 72 to 40 hours and sometimes less. The velocity of the draft-current also keeps the interstices between the clay articles clear of accumulations of cinders, soot, etc. from the fires, so that in the water-smoking as well as in the high firing stage, a free and clear passage is maintained around each article, the force of the current carrying all such particles out through the discharge passage and fan, thereby permitting uniform access of the heat to all of the articles as will be readily understood. The rapid removal of such particles operates to prevent staining and gives a lighter and better color to the entire product of the kiln, but this result I believe to be also due in part to the effect of the rapid evaporation, above explained, since the staining particles obviously have less tendency to adhere to the surfaces on which they impinge if the said surfaces are relatively dry, and even after impingement on a moist surface the tendency will be for them to be dried off or swept away before staining and discoloration can take place by their dissolution in the moisture. As a consequence of these various improved conditions, I am enabled to stack the articles in the kiln more closely together than the common practice and more nearly to the roof of the kiln, so that the capacity of the latter is thereby correspondingly augmented.

During the water-smoking stage the temperature is maintained at or slightly above 200° F.; in the high-firing stage it is increased by regular increments, added thereto in a positive manner, by correspondingly speeding the forced-air blower with a coincident increase in the rate of coal supply. For instance, when the water-smoking stage has been concluded, as evidenced by the absence of moisture in the exhaust from the suction fan, the formed draft blower is thereupon speeded with or without coincident increase of the suction fan speed to stimulate the coal combustion so as to add to the kiln temperature at the rate of about 50° F. per hour, for a period of twenty-four hours. At the termination of this period the kiln, containing flue-linings for example, should have reached the temperature of about 1400° F. Thereupon, the increment of temperature rise is reduced (by a corresponding manipulation of the suction fan and blower) to about 25° F. per hour, and this rate is continued until about 2000° F. or 2200° F. is reached, and thereafter the kiln is maintained at this temperature, without substantial diminution, until the clay is determined to be fully burned.

It is important in the high-firing stage of my process that the temperature should at no time be allowed to fall or diminish until the process is complete; that it to say, the temperature curve of the kiln should be a constantly ascendant curve up to the 2000° mark, for I have ascertained that the percentage of loss by popping and other causes has direct relation to the extent and number of times that the temperature of the stack— the articles themselves—has been allowed to diminish. I am enabled by my invention to produce such ascending temperature curve whereby such loss is avoided.

The accompanying semi-diagrammatic drawing illustrates in vertical section an apparatus for carrying out the invention.

The kiln, marked 1, is shown as provided with a suitable number of fire-places 2 built in its outer wall and with their rear fire-bridge walls 3 within the kiln, so that the combustion gases are deflected upwardly toward the dome-shaped roof. The ash-pits of the several fire-places are suitably connected with a forced air pipe system 5. A blower 6, driven by a motor 6′, delivers air into this system at a pressure above atmosphere, but subject to control in respect to its pressure and volume. The hot gases pass downward through the stack of clay articles, not shown, in the kiln and into an underground conduit 8, which may deliver into a chimney 20. This chimney is shown as provided with a partition damper 15. The suction fan is shown at 13, driven by a motor 13′, its suction pipe 14 being connected with the interior of the chimney below the partition 15 and its delivery pipe 17 opening into the chimney above the said partition.

In carrying out the process, the green clay articles are stacked in the kiln in the usual or in any suitable manner, except that they may be placed more closely together than ordinarily, and fires are kindled upon the grates 4 of the several fire-places. Thereupon the forced air blower and the suction fan are set in motion. The draft currents from the beds of burning coal in the fire-places strike upwardly to the dome of the kiln, and are then drawn downwardly by the suction of the fan, passing through the spaces between the clay articles and thence through the underground conduit 8 to the lower part of the chimney, thence through the fan and into the upper part of the chimney to the atmosphere.

While the gases are pursuing the course just stated the fuel supply is relatively limited so as to establish a temperature inside and running from 100° to about 200° F. and remaining at the latter temperature for such period as may be required for removing the moisture from the green clay, and the suction fan is speeded during such period to produce as high velocity of draft current through the stack as is conveniently attainable, the rate of delivery from a kiln of say 20 feet diameter by 12 feet high, being preferably between 12000 and 14000 cubic feet per minute or higher, which arrangement also results in a reduction of pressure inside of the kiln most conducive to rapid and effective evaporation of the moisture. When water-smoking has been completed, the combustion in the fire place is then stimulated by more frequent stoking and increased fuel supply and by increasing the pressure of the forced air-draft current to give the desired temperature increments. For this purpose the speed of the suction fan may be already sufficient, or it may be necessary in some cases to reduce its speed, but in any event the relative speeds of blower and suction fan properly coördinated to produce and maintain the pressure inside of the kiln substantially equal to, and not greater than atmosphere. The connections for controlling the suction fan and blower, being the ordinary ones, are not illustrated.

The whole process will be found to be completed in about 68 hours or three days, whereas with prior methods it has required at least four days and frequently five or more to accomplish a similar result. It will be noted moreover that such improvement in respect of the duration of the process is obtained with only four fire-places, each having about 15 square feet of grate surface, as against 12 or more fire-places commonly employed in kilns of like dimensions. With a kiln of smaller size, a still smaller number of furnaces will be sufficient.

The fuel used may be of the relatively cheaper grades of coal, which produce but little if any aqueous vapor by their combustion, and I prefer to use buckwheat anthracite coal with the forced air supply free from steam.

It will be understood that I do not limit myself to any one form of apparatus, or to the particular course of the gases and draft currents illustrated, or to the use of a down draft.

I claim as my invention the following:

1. The process of burning clay articles which consists in stacking such articles in a kiln, establishing a bed of burning fuel, forcing air through such bed into the kiln and artificially withdrawing the air and gases from the kiln, the forcing and inducing efforts being controlled in relation to each other according to the conditions desired.

2. The process of burning clay articles which consists in forcing air through a bed of burning fuel and simultaneously artificially exhausting the gases from the kiln so as to create a high velocity draft through a stack of such articles in the kiln, and conjointly controlling the forcing and exhausting means.

In testimony whereof, I have signed this specification in the presence of two witnesses.

JOHN C. QUINN.

Witnesses:
C. W. MANSFIELD,
J. V. RYAN.

Copies of this patent may be obtained for five cents each, by addressing the "Commissioner of Patents, Washington, D. C."